…

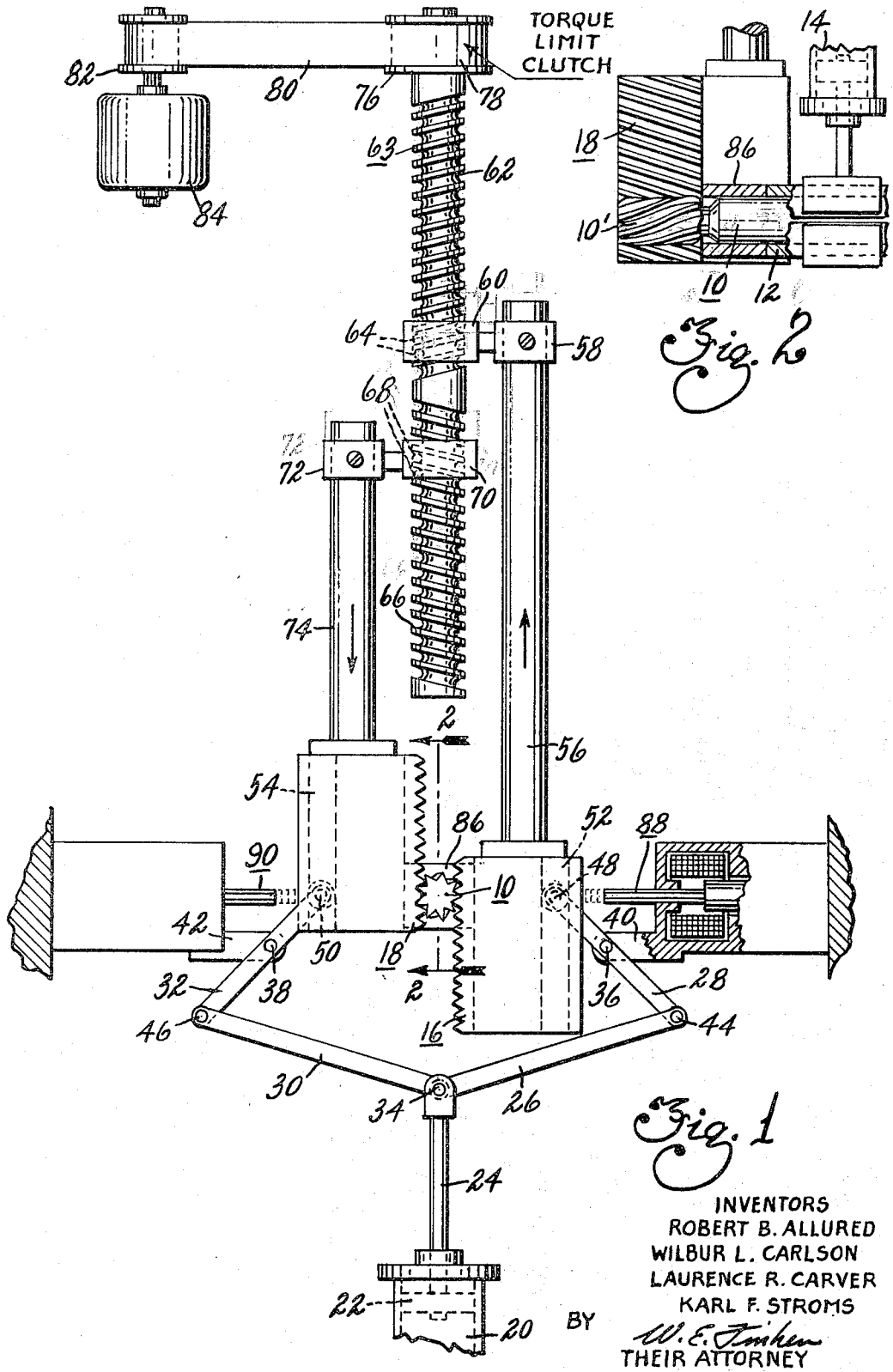

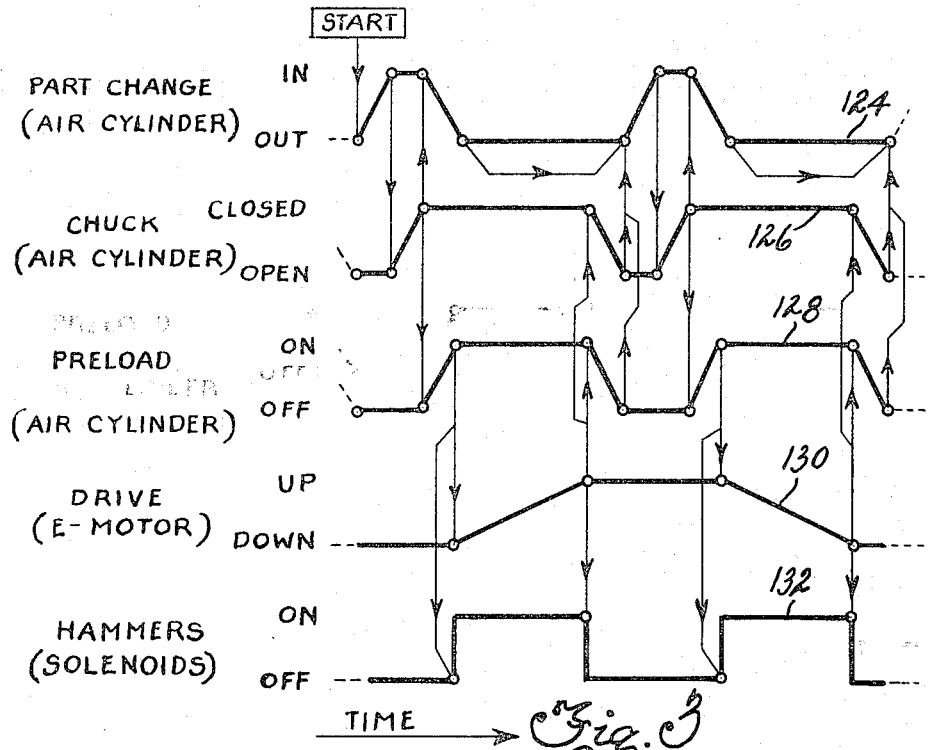
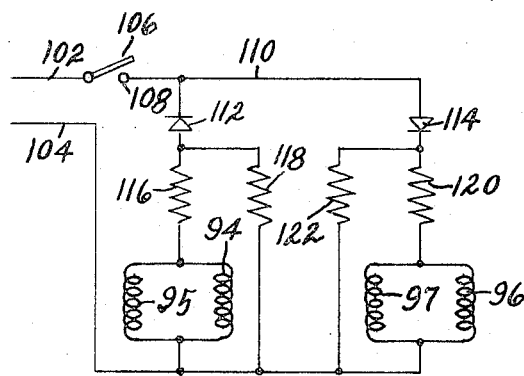
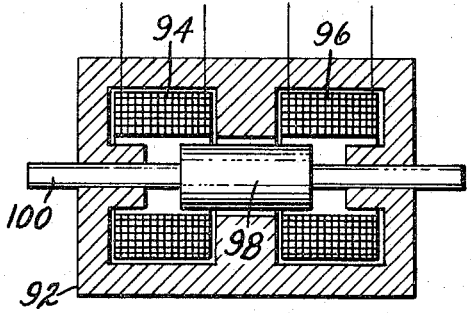
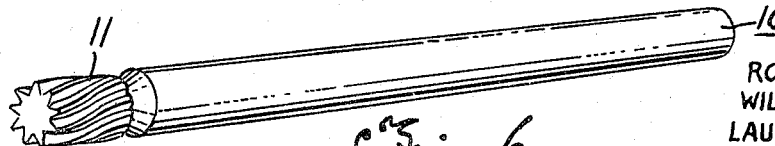
INVENTORS
ROBERT B. ALLURED
WILBUR L. CARLSON
LAURENCE R. CARVER
KARL F. STROMS
BY
THEIR ATTORNEY

3,303,682
METHOD AND APPARATUS FOR COLD FORMING TOOTHED ELEMENTS

Robert B. Allured, Rochester, Laurence R. Carver, Detroit, and Karl F. Stroms, Utica, Mich., and Wilbur L. Carlson, Rochester, N.Y., assignors to General Motors Corporation, Detroit, Mich., a corporation of Delaware
Filed Feb. 1, 1962, Ser. No. 170,438
14 Claims. (Cl. 72—88)

This invention pertains to a chipless method of forming toothed elements, and particularly to a method of cold forming toothed elements and apparatus for carrying out such a method.

Heretofore, numerous methods of forming toothed elements on cylindrical workpieces, and apparatus for carrying out such methods, have been devised. For the most part, however, the known methods include either the step of heating the cylindrical workpiece to a predetermined depth by such means as an induction heater with the use of straight tool racks, or cold forming toothed elements on cylindrical workpieces by the use of rotating die-rollers. The present invention comprehends a method of cold forming toothed elements using straight tool racks which are reciprocable in opposite directions, and wherein the energy required for cold forming is delivered to the tool racks by synchronized hammer means.

Accordingly, among our objects are the provision of an improved method of cold forming toothed elements on cylindrical workpieces; the further provision of a method of cold forming toothed elements utilizing rapid impact of repeatedly striking hammer means; the further provision of apparatus for carrying out the aforesaid method; the further provision of cold forming apparatus including a pair of synchronized magnetic hammer means; and the still further provision of a self-synchronized energizing circuit for dual magnetic hammers.

The aforementioned and other objects are accomplished in the present invention by utilizing the impact of rapidly striking hammer means to progressively cold form a toothed surface on a cylindrical workpiece. Specifically the initial cylindrical workpiece has a diameter substantially equal to the pitch diameter of the finished toothed element. The cylindrical workpiece is clamped in a free-wheeling stationary chuck and disposed between two straight tool racks which are reciprocable in parallel paths, but in opposite directions.

The tool racks are initially engaged with the cylindrical workpiece under light pressure so as to assure positive engagement therewith. Thereafter, as the tool racks are reciprocated in opposite directions they are repeatedly engaged by synchronized hammer means, the hammer means operating in a direction normal to the direction of movement of the tool racks, and with the line of action of the hammer means being in substantial alignment with the center of the workpiece. As the tool racks move in opposite directions, the toothed surfaces thereof gradually penetrate the cylindrical workpiece by displacing material therefrom to the addendum of the teeth. A positive stop limits penetration of the tool racks into the workpiece so as to assure proper dimensions of the finished toothed element.

The magnetic hammers comprise solenoid coils and plungers, wherein two coils of equal length are placed end to end, and a plunger having a length equal to one of the coils is slidably mounted therebetween. In this manner a bilateral solenoid action is achieved, and by alternate energization and deenergization of the coils, each hammer is caused to oscillate back and forth between the coils at a frequency equal to the energization frequency.

A self-synchronizing circuit is used to energize the coils of the two magnetic hammers, this circuit comprising a pair of blocking diodes connected in opposite directions so that one coil of each magnetic hammer is energized during each half cycle. The parallel arrangement of the coils of the dual magnetic hammers provides an inherent self-synchronizing circuit.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a schematic layout of apparatus for carrying out the improved cold forming method, shown partly in section and partly in elevation.

FIGURE 2 is a fragmentary sectional view taken along line 2—2 of FIGURE 1.

FIGURE 3 is an impulse diagram of the automatic cycle of the apparatus.

FIGURE 4 is a longitudinal sectional view of the magnetic hammer construction.

FIGURE 5 is a schematic of the energizing circuit for the dual magnetic hammers.

FIGURE 6 is a perspective view of a toothed element formed in accordance with the process of this invention and with the apparatus disclosed herein.

With particular reference to FIGURES 1 and 2, a cylindrical workpiece 10 is clamped in a free-wheeling stationary chuck 12 which is preferable actuated by an air cylinder 14. The end 10' of the cylindrical workpiece 10, on which the toothed element is to be formed, is located between two straight tool racks 16 and 18. The tool racks are caused to initially engage the portion 10' of the workpiece under light pressure by an air operated toggle mechanism including an air cylinder 20 having a piston 22 connected by a rod 24 with a double action toggle linkage including links 26, 28, 30 and 32. The links 26 and 30 are pivotally connected at 34 to the rod 24, and the links 28 and 32 are respectively pivotally connected at 36 and 38 to hammer brackets 40 and 42, respectively. The link 28 is pivotally connected at 44 to the outer end of link 26 and the link 32 is pivotally connected at 46 to the link 30. The other ends of the links 28 and 32 are slidably mounted at 48 and 50, respectively, in guides, or tracks, 52 and 54 of the tool racks 16 and 18, respectively. When the cylinder 29 is pressurized, the tool racks 16 and 18 will engage the portion 10' of the cylindrical workpiece 10 with the same force.

The tool rack 16 is supported by a rod 56 having a bracket 58 adjacent its outer end which carries a nut 60. The nut 60 constitutes a component of a conventional ball screw and nut assembly including a right-hand screw 62 having a groove for receiving balls 64 constituting the threaded connection between the screw 62 and the nut 60. The right-hand ball screw 62 is formed on a shaft 63 integral with a left-hand ball screw 66 having groove receiving balls 68 which threadedly connect the ball screw 66 with a second nut 70 carried by a bracket 72 attached to the outer end of a rod 74 supporting the tool rack 18. The shaft 63 having the integral right-hand and left-hand ball screws 62 and 66 is coupled to a pulley 76 through a torque limit clutch 78 of conventional design. The pulley 76 is connected by a timing belt 80 to a pulley 82 driven by a reversible high torque electric motor 84.

Obviously, the leads of the ball screws 62 and 66 must be identical, but of opposite hands. The ball nuts 64 and 66 are preloaded to eliminate backlash, and the ball nuts will thus move simultaneously in opposite directions during rotation of the screw shaft and are suitably guided by tool slides. The tool racks 16 and 18 are supported in cross slides so as to be free to move perpendicular to the drive tool slides as controlled by the preload and the magnetic hammers, to be described. The depth of penetration of the tool racks into the cylindrical workpiece is positively determined by a solid stop 86 for the tool racks.

As seen in FIGURE 1, the tool rack 16 has associated therewith a magnetic hammer 88, and the tool rack 78 has associated therewith a magnetic hammer 90. The workpiece 10 is free to rotate between the two racks 16 and 18 during the forming operation, and the hammers 88 and 90 repeatedly strike the racks 16 and 18 to cause the racks to penetrate the workpiece.

With reference to FIGURE 4, each magnetic hammer comprises a soft steel shell, or housing, 92 having a central throughbore and containing a pair of coils 94 and 96 of equal length which are placed end to end. The hammer itself comprises a soft steel plunger 98 disposed within the shell 92. The plunger 98 is of a length substantially equal to the length of each coil 94 and 96, and accordingly upon alternate energization of the coils 94 and 96, bilateral solenoid action is obtained causing the plunger 98 to reciprocate back and forth between the coils at a frequency equal to the energizing frequency. The plunger 98 is mounted on a stainless steel shaft 100 which constitutes the hammer. The hammer can be driven at any frequency provided there is sufficient power to accelerate the mass in synchronism with the frequency of the alternating current excitation.

Referring to FIGURE 5, the energizing circuit for the dual magnetic hammers comprises a 440 volt, 60 cycle single phase alternating current source having input leads 102 and 104. Lead 102 contains an "on-off" switch 106 having a stationary contact 108 connected by a wire 110 to a pair of oppositely connected blocking diodes 112 and 114. The diode 112 is connected in series with a current limiting resistor 116 which is connected to parallel arranged coils 94 of hammer 88 and 95 of hammer 90. The resistor 114 and coils 94 and 95 are shunted by a resistor 118. The diode 114 is connected in series with a current limiting resistor 120 which is connected in parallel with coil 96 of hammer 88 and coil 97 of hammer 90. The resistor 120 and the coils 96 and 97 are shunted by a resistor 122. The resistors 116, 118, 120 and 122 are utilized to provide a fast rise and decay of current through the solenoid coils 94, 95, 96 and 97. Thus, the resistors 116 and 120 provide a circuit with a short rise time, and the resistors 118 and 122 provide a circuit with a short decay time and also limit the inductive transient voltage to a safe value.

The parallel arrangement of the coils of the two magnetic hammers 88 and 90 results in an inherent synchronizing system. Thus, the inductive reactance of the coils of each magnetic hammer is dependent upon the position of its respective plunger, and accordingly if one hammer lags behind the other, the inductive reactance will be lower and therefore more current will flow through this hammer so as to bring it back into synchronism with the other hammer. This feature is extremely important in the cold forming operation since it is only in this way that proper dimensional control of the workpiece can be assured.

Referring to FIGURE 3, the cycle of the machine is disclosed schematically in the impulse diagram. The curve 124 defines the operation of the air cylinder for supplying and removing workpieces to and from the air operated chuck 12. The curve 126 indicates the operation of the air operated chuck in opening and closing. The curve 128 indicates the operation of the air cylinder 20 for preloading the racks 16 and 18. The curve 130 indicates the direction of movement of the motor 84, and the curve 132 indicates the operating cycle of the dual magnetic hammers.

Thus, the cycle of operation comprises the steps of placing the workpiece in the chuck 12, closing the chuck 12, preloading the tool racks 16 and 18 through the air cylinder 20, energizing the motor 84 to rotate the screw shaft in one direction or the other and thus reciprocate the tool racks 16 and 18 simultaneously in opsite directions at the same speed. The tool racks rotate the workpiece during reciprocation. Alternatively, the workpiece may be positively driven by any suitable means, not shown. During reciprocation of the tool racks 16 and 18, the magnetic hammers 88 and 90 are alternately rapidly energized in frequency and phase synchronism, and the repeatedly striking hammers cause the tool racks 16 and 18 to gradually penetrate the portion 10' of the workpiece and displace material to the addendum of the teeth. Penetration of the tool racks is limited by the positive stop 10. After a complete stroke of the tool racks 16 and 18 in one direction, the workpiece is removed and another workpiece is inserted into the chuck to repeat the cycle of operation.

As shown in FIGURE 6, the finished steel workpiece 10 has a helical gear 11 formed on the end thereof. However, the instant method and apparatus can be used equally well for straight or helical spline teeth, or gear teeth of other configurations, such as straight gear teeth, and gear teeth having a pressure angle as low as 15°.

In known apparatus utilizing reciprocating tool racks, only gears having pressure angles between 40° and 45° can be produced. In the known die-roller apparatus, the machine either must be indexed from tooth to tooth, or the pressure angle is likewise limited to the range of 40° to 45°. Moreover, with known apparatus of either type, extremely high cantilever loading of the teeth in die results. However, all of these disadvantages are overcome by following the teachings of this invention.

While the embodiment of the invention as herein disclosed constitutes a preferred form, it is to be understood that other forms might be adopted.

What is claimed is as follows:

1. The method of cold forming teeth on a cylindrical member comprising the steps of, rotatably supporting a cylindrical member between a pair of tool racks reciprocating the tool racks in opposite directions, and simultaneously hammering the tool racks in a direction normal to the direction of reciprocation to cause the racks to gradually penetrate the cylindrical member by displacing material therefrom.

2. The method of cold forming teeth on a cylindrical member comprising the steps of, rotatably supporting a cylindrical member between a pair of tool racks, engaging the tool racks under light pressure with the cylindrical member, reciprocating the tool racks in opposite directions to rotate said cylindrical member, and simultaneously repeatedly and rapidly hammering the tool racks in a direction normal to the direction of reciprocation to cause the racks to gradually penetrate the cylindrical member by displacing material therefrom.

3. The method of cold forming teeth on a cylindrical member comprising the steps of, rotatably supporting a cylindrical member between a pair of tool racks, reciprocating the tool racks in opposite directions, simultaneously repeatedly and rapidly hammering the tool racks in a direction normal to the direction of reciprocation to cause the racks to gradually penetrate the cylindrical member by displacing material therefrom, and finally engaging the tool racks with a positive stop to limit penetration of the tool racks into the cylindrical member.

4. The method of cold forming teeth on a cylindrical member comprising the steps of, rotatably supporting a cylindrical member between a pair of tool racks, reciprocating the tool racks in opposite directions at the same rate of movement, and simultaneously repeatedly and rapidly hammering the tool racks in a direction normal to the direction of reciprocation and in alignment with the axis of the cylindrical members to cause the racks to gradually penetrate the cylindrical member by displacing material therefrom.

5. The method of cold forming teeth on a cylindrical member comprising the steps of, rotatably supporting the cylindrical member between a pair of tool racks, engaging the tool racks with the cylindrical member under light pressure to assure positive driving engagement therewith, reciprocating the tool racks in opposite directions at the same rate of movement, simultaneously rapidly and repeatedly hammering the tool racks in a direction normal to the direction of reciprocation, and in alignment with the axis of the cylindrical member to cause the racks to gradually penetrate the cylindrical member by displacing material therefrom, and finally engaging the tool racks with a positive stop to limit penetration of the racks into the cylindrical member.

6. The method of cold forming teeth on a cylindrical member comprising the step of, rotatably supporting a cylindrical member between a pair of tool racks, reciprocating the tool racks in opposite direction at the same rate of movement, and simultaneously rapidly and repeatedly hammering the tool racks in a direction normal to the direction of reciprocation in phase and at the same frequency to cause the racks to gradually penetrate the cylindrical member by displacing material therefrom.

7. The method of cold forming teeth on a cylindrical member comprising the steps of, rotatably supporting a cylindrical member between a pair of tool racks, reciprocating the tool racks in opposite directions at the same rate of movement, rotating the cylindrical member during reciprocation of the tool racks, and simultaneously hammering the tool racks in a direction normal to the direction of reciprocation to cause the racks to gradually penetrate the cylindrical member by displacing material therefrom.

8. Apparatus for cold forming teeth on a cylindrical member including, a free-wheeling chuck adapted to support a cylindrical member, a pair of tool racks disposed on opposite sides of said cylindrical member, means to engage said racks with said cylindrical member under light pressure to establish a driving connection therebetween, means operable to reciprocate the tool racks in opposite directions at the same rate of movement, and synchronized hammer means operable to repeatedly and rapidly strike said racks during reciprocation thereof to cause the racks to gradually penetrate the cylindrical member by displacing material therefrom.

9. Apparatus for cold forming teeth on a cylindrical member including, a chuck adapted to rotatably support a cylindrical member, a pair of tool racks disposed on opposite sides of said cylindrical member, drive means for reciprocating said tool racks in parallel paths and in opposite directions at the same rate of movement, means operable to engage said tool racks with said cylindrical member under light pressure to establish a driving connection therebetween prior to reciprocation of said tool racks whereby reciprocation of said tool racks will rotate said cylindrical member, and synchronized hammer means for repeatedly and rapidly striking said tool racks in a direction normal to the direction of their reciprocation to cause said racks to gradually penetrate the cylindrical member by displacing material therefrom.

10. Apparatus for cold forming teeth on a cylindrical member including, a chuck adapted to rotatably support a cylindrical member, a pair of tool racks disposed on opposite sides of said cylindrical member, means operable to press said tool racks into engagement with said cylindrical member to establish a driving connection therebetween, driving means operable to impart reciprocation to said tool racks in opposite directions and at the same rate of movement so as to impart rotation to said cylindrical member, synchronized hammer means operable to repeatedly and rapidly strike said racks in a direction normal to the direction of reciprocation so as to cause said racks to gradually penetrate the cylindrical member by displacing material therefrom, and positive stop means engageable with said racks to limit the penetration of said racks into said cylindrical member.

11. The apparatus set forth in claim 10 wherein said drive means comprises a shaft having integral right and left-hand screws, and wherein each rack is coupled to said screws through a nut.

12. The apparatus set forth in claim 10 wherein the means for pressing said racks into engagement with said cylindrical member comprises a toggle linkage.

13. The apparatus set forth in claim 10 wherein the synchronized hammer means are magnetically actuated, and a self-synchronizing energizing circuit for said magnetically actuated hammer means.

14. The method of cold forming teeth on a cylindrical member comprising the steps of, locating a cylindrical member between a pair of tool racks, rotating the cylindrical member in timed relation with reciprocation of the tool racks in opposite directions, and simultaneously rapidly and repeatedly hammering the tool racks in a direction normal to their direction of reciprocation to cause the racks to gradually penetrate the cylindrical member by displacing material therefrom.

References Cited by the Examiner

UNITED STATES PATENTS

| | | | |
|---|---|---|---|
| 407,843 | 7/1889 | Simonds | 72—88 |
| 2,083,168 | 6/1937 | Larson | 72—430 |
| 2,613,241 | 10/1952 | Gulliksen | 318—125 |
| 2,700,746 | 6/1955 | Vang | 318—125 |
| 2,994,237 | 8/1961 | Pelphrey | 80—20 |
| 2,995,964 | 8/1961 | Drader | 80—20 |

CHARLES W. LANHAM, *Primary Examiner.*

LEON PEAR, *Examiner.*

C. H. HITTSON, H. D. HOINKES, *Assistant Examiners.*